United States Patent [19]

Niemeyer, III

[11] Patent Number: 4,873,538
[45] Date of Patent: Oct. 10, 1989

[54] PEN SHUTTLE GUIDE AND SPRING RETURN

[75] Inventor: Robert H. Niemeyer, III, Beaverton, Oreg.

[73] Assignee: AM International Corporation, Chicago, Ill.

[21] Appl. No.: 207,216

[22] Filed: Jun. 16, 1988

Related U.S. Application Data

[63] Continuation-in-part of Ser. No. 75,533, Jul. 20, 1987, Pat. No. 4,763,140.

[51] Int. Cl.$^4$ .......................... G01D 9/30; G01D 15/16
[52] U.S. Cl. .................................. 346/139 R; 346/46; 346/141
[58] Field of Search ..................... 346/139 R, 46, 141, 346/140 R, 29, 49

[56] References Cited

U.S. PATENT DOCUMENTS

4,500,890 2/1985 Nicholas .......................... 346/139 R
4,527,176 7/1985 Fujiwara ............................. 346/141

Primary Examiner—E. A. Goldberg
Assistant Examiner—Mark Reinhart
Attorney, Agent, or Firm—Roy A. Ekstrand; Nicholas A. Camasto

[57] ABSTRACT

A rotary action graphic recording system includes a pen carriage supporting a linear array of moveable pen shuttle assemblies each of which support recording pens together with means for moving the pen carriage in a carriage path. Rotary actuation means are supported by and operative upon the pen carriage to engage selected ones of the recording pens for movement into contact with the recording media. The rotary actuating means are operated by an elongated actuator beam supported in parallel with the carriage path and coupled to the rotary actuating means. Brake means within the rotary actuator are provided which are operative to engage the actuator beam and permit alignment of the rotary actuator with a selected pen within the pen carriage array by movement of the pen carriage. The moveable pen shuttle assemblies are slideably captivated within pen channels formed in the pen carriage and are supported by interposed bearings. Spring returns bias the pen shuttle assemblies to their nonrecording positions.

19 Claims, 4 Drawing Sheets

PEN SHUTTLE GUIDE AND SPRING RETURN

CROSS REFERENCE TO RELATED APPLICATIONS

This application is a continuation in part of a copending application entitled ROTARY ACTION GRAPHIC RECORDING SYSTEM, filed July 20, 1987 in the name of Robert H. Niemeyer III, Ser. No. 07/075,533 now U.S. Pat. No. 4,763,140 and assigned to the assignee of the present application and which is hereby incorporated by reference.

FIELD OF THE INVENTION

This invention relates generally to graphic recording systems and particularly to those in which a plurality of recording elements are carried by a moveable carriage and in which selected ones of the recording elements are moved into recording contact with the media.

BACKGROUND OF THE INVENTION

A substantial number of graphic recording systems have been developed to provide automated or computer controlled graphic recording upon a media. While the individual structures of such graphic recorders vary substantially, generally all include a media transport system in which the media is moved in a first direction and a moveable pen carriage supported and controlled to provide motion of the pen carriage in a second direction relative to media motion. In most instances, the directions of media movement and pen carriage movement are orthogonal.

With the development of computer drive systems having increased capability, there arose a need to provide graphic recording systems employing a plurality of recording pens which commonly facilitated multiple color selection.

One example of a multiple pen graphic recorder is set forth in U.S. Pat. No. 3,401,401 issued Sept. 10, 1968 to Read et al. for Multiple Pen Carriage. The device set forth in Read provides four pens supported on a moveable carriage together with a corresponding group of four independent actuating devices each operative upon one of the pens. The use of multiple actuating devices supported on the moveable carriage substantially increases the overall mass of the pen carriage which in turn substantially limits the speed and acceleration of pen carriage motion.

Another example of prior art multiple pen graphic recorders is set forth in U.S. Pat. No. 4,135,245 issued Jan. 16, 1979 to Kemplin et al. for Plotter With Automatic Pen Changer. The system set forth in Kemplin utilizes a stationary pen repository in which multiple pens are maintained. A moveable recording head is configured to receive and support a single recording pen and means are provided for interrupting the recording process in order to exchange the pen supported by the recording head with a different pen in the stationary pen repository. While the system set forth in Kemplin avoids the increase of pen carriage mass caused in the Read System, it increases the recording time due to the interruption of recording during pen substitution.

Still another example of multiple pen graphic recording systems is set forth in U.S. Pat. Ser. No. 4,500,890 issued Feb. 19, 1985 to Nicholas for Graphic Recording System which is commonly owned with the present invention. The system set forth in Nicholas provides a moveable carriage supporting a plurality of recording pens together with a single actuator selectively operative upon the pens.

Still another example of multiple pen graphic recording systems is set forth in U.S. Pat. No. 4,578,683 issued Mar. 25, 1986 to Gordon and entitled Graphic Recording System which is commonly owned with the present invention. In the Gordon System, a moveable pen carriage supports a plurality of recording elements. The carriage is moveable in two directions along a path relative to the recording media and an associated actuator arm mechanism is moveably supported on a rod. The rod has its longitudinal axis generally parallel to the carriage path. Stationary operating means are coupled to the rod and are operative to move the selected pen into engagement with the recording media. The system set forth in Gordon provides substantial advantage over the prior art systems in its avoidance of powered actuating means upon the pen carriage and its reduction of overall mass of the pen carriage.

In the above-referenced copending application, there is set forth a ROTARY ACTION GRAPHIC RECORDING SYSTEM having a lightweight moveable pen carriage in which recording pens are arranged in a linear array and in which pen selecting means are supported apart from the carriage to avoid the need of supporting powered pen selection mechanisms upon the moveable carriage. The use of such pen selection raises the need for accurate controllable pen selection and motion means. The structure set forth herein is directed toward meeting that need.

SUMMARY OF THE INVENTION

Accordingly, it is a general object of the present invention to provide an improved graphic recording system. It is a more particular object of the present invention to provide an improved graphic recording system using a low mass multiple pen carriage. It is a still more particular object of the present invention to provide a pen shuttle guide and spring return for use in a graphic recording system which simultaneously facilitates pen selection and maintains accuracy of recording pen motion.

In accordance with the invention there is provided for use in a graphic recording system having motion means for supporting and moving a pen carriage along a carriage path, pen shuttle guide means comprising a pen carriage supported and moved by and under the control of the motion means having a plurality of pen channels each having first and second pluralities of surfaces, a plurality of pen shuttles configured to receive a corresponding plurality of recording elements each slideably supported against the first plurality of guide surfaces within the plurality of pen channels, a plurality of pen shuttle backs each secured to one of the plurality of pen shuttles and slideably supported against the second plurality of guide surfaces within one of the pen channels, and a plurality of bearing means interposed between the pen shuttles and pen shuttle backs and the guide surfaces.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
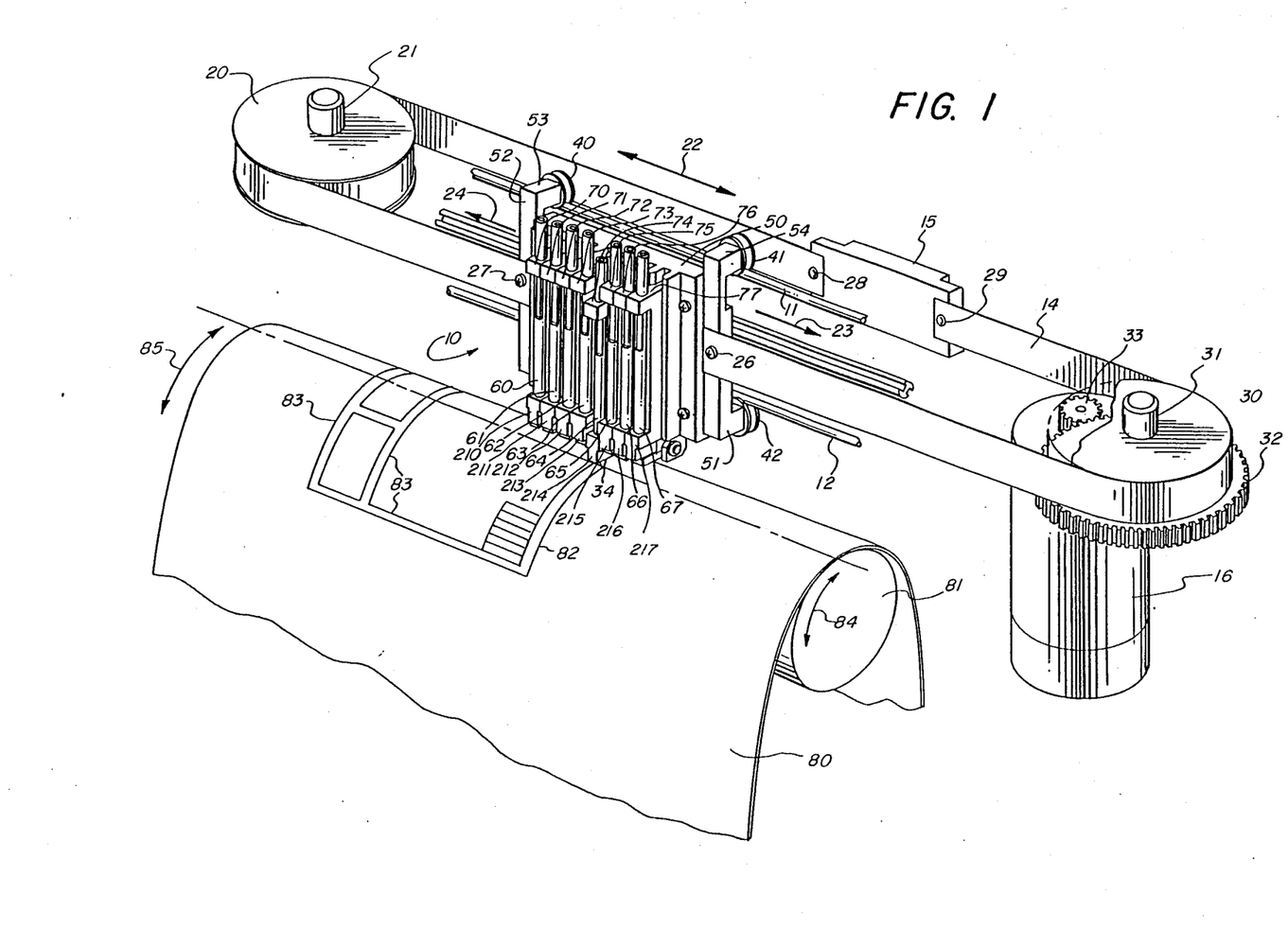
FIG. 1 is a general perspective view of a graphic recording system having a pen shuttle guide and spring return constructed in accordance with the present invention.

FIG. 1 sets forth a perspective view of a rotary actuated graphic recording system having a pen shuttle guide and spring return constructed in accordance with the present invention in which a moveable pen carriage generally referenced by numeral 10 is secured to and controlled by a closed flexible carriage band 14. Carriage band 14, in its preferred form, comprises a generally flat ribbon-like band of stainless steel. An upper track 11 and lower track 12 are supported parallel to the motion path of the forward portion of carriage band 14 by means not shown to provide a substantially rigid construction in which upper track 11 and lower track 12 may support the weight of and resist the vibrations of pen carriage 10.

Pen carriage 10 includes a pen shuttle guide 50 which in its preferred form is formed of a lightweight, rigid, plastic material. A pair of generally U-shaped wheel support members, also preferably formed of a lightweight, rigid, plastic material 51 and 52, are secured to pen shuttle guide 50 by means set forth below in greater detail. Wheel support 51 terminates at one end in a rearwardly extending axle support 54 and at the other end in a similar axle support 55. Wheel support 52 is identical to wheel support 51 and terminates at one end in a rearwardly extending axle support 53 and a rearwardly extending axle support 56 at the other end (the latter seen in FIG. 3). A quartet of grooved wheels 40, 41, 42, and 43 (also better seen in FIG. 3) are rotatably secured to axle supports 53, 54, 55, and 56 respectively. Wheels 40 through 43 are configured to receive and provide a track engagement with upper track 11 and lower track 12. The resulting cooperation of wheels 40 through 43 and tracks 11 and 12 retains pen carriage 10 in a rolling engagement with upper track 10 and lower track 12 such that pen carriage 10 is freely moveable in the direction indicated by arrows 23 and 24.

In accordance with an important aspect of the invention, pen carriage 10, by means set forth below in greater detail, supports a plurality of generally elongated pen shuttles 70 through 77 which are moveably secured to pen shuttle guide 50 in a linear array. In the preferred arrangement pen shuttles 70 through 77 are generally perpendicular to the direction of travel of pen carriage 10. Pen shuttles 70 through 77 each support a corresponding one of a plurality of pens 60 through 67 respectively such that motion of a selected one of pen shuttles 70 through 77 results in a corresponding motion of the associated pen. By way of example, FIG. 1 depicts pen shuttles 70 through 73 and 75 through 77 in their raised position while pen shuttle 74 is shown in its downwardly extending or lowered position. Correspondingly, pens 60 through 66 and 65 through 67 are supported in their raised position by a spring better shown in FIG. 4 while pen 64 is supported in its downwardly extending position.

A media drive roller 81, which may be constructed in accordance with the presently known graphic recording system media drive structures, is supported by conventional means (not shown) such that its major axis is generally parallel to the travel path of pen carriage 10. A flexible media 80 comprising a long sheet representative of a typical media material is supported by media roller 81 such that rotational motion of media roller 81 in the path indicated by arrows 84 results in a corresponding linear motion of media 80.

A pair of pulleys 20 and 30 are rotatably supported by a pair of pulley supports 21 and 31 respectively. By means not shown but which may include any conventional pulley support mechanism, pulleys 20 and 30 are supported at opposite ends of the travel path of carriage band 14. The respective ends of carriage band 14 are joined by a pair of fasteners 28 and 29 to an elongated counter weight 15. Except for the gap at counterweight 15, carriage band 14 comprises a continuous ribbon of material extending from fastener 28 around pulley 20 through pen carriage 10 and around drive pulley 30 to fastener 29. As a result, carriage band 14 extends through pen carriage 10 by means set forth below in greater detail. Pulley 20 comprises a free moving idler pulley while drive pulley 30 supports a ring gear 32. A carriage motor 16 which may comprise any of the number of presently available bidirectional electric motors supports a drive gear 33 which in accordance with generally accepted principles of graphic recorder construction is operatively coupled to the armature of carriage motor 16 (now shown) such that energizing carriage motor 16 results in rotating gear 33. Drive pulley 30 is supported with respect to gear 33 such that gear 33 engages gear 32 causing drive pulley 30 to rotate in response to energizing of carriage motor 16. By means not shown, but in accordance with generally accepted fabrication techniques, carriage band 14 is maintained in tension to provide effective coupling of motion between drive pulley 30 and carriage band 14. As a result, rotational drive pulley 30 produces corresponding motion of carriage band 14 in the path indicated by arrow 22 which in turn produces a corresponding motion of pen carriage 10 in the path indicated by arrows 23 and 24.

An elongated actuator beam 13 is supported in a substantially parallel relationship with the travel path of pen carriage 10 by means not shown. Actuator beam 13 is operatively coupleable to selected ones of pen shuttles 70 through 77 to produce vertical motion of a selected one of pens 60 through 67.

In operation, electronic control means constructed in accordance with generally accepted graphic recording system techniques are operative to cause motor 16 to drive carriage band 14 and thereby pen carriage 10 back and forth along the travel path indicated by arrows 23 and 24 to produce motion of pen carriage 10 in either of two directions along the carriage travel path. Concurrently, the electronic control means are operatively coupled to media roller 81 through conventional fabrication techniques to rotate media roller 81 in either of the directions indicated by arrow 84 and cause a corresponding motion of media 80 in either of the directions indicated by arrow 85. By means set forth in greater detail in the above-referenced copending application, a selected pen shuttle such as pen 74 is moved by rotation of actuator beam 13 in a downward direction until pen point 34 of pen 64 contacts the surface of media 80. Thereafter, under control of the electronic control means, combinations of pen carriage motion in directions indicated by arrows 23 and 24 together with coordinated motions of media 80 in the directions indicated by arrow 85 result in recording a plurality of line markings 83 upon media 80.

While pens 60 through 67 may comprise recording pens having a variety of pen characteristics, most commonly pens 60 through 67 will be selected to provide different color recording pens. Accordingly, by means set forth below in greater detail and in the above-referenced copending application, operation of actuator beam 13 and the rotary pen actuation described therein cooperate with carefully controlled motion of pen carriage 10 to permit the selective use of the desired one of pens 60 through 67. As mentioned, the operation of the present invention rotary pen actuation is set forth in greater detail below and in the above-referenced copending application. However, suffice it to note here that there are no electrically powered pen actuation or selection means carried or supported by pen carriage 10. The selection of the desired one of pens 60 through 67 is achieved entirely by the cooperation of passive elements supported by pen carriage 10 which in turn are driven by stationary powered actuation means.

Figure 2:
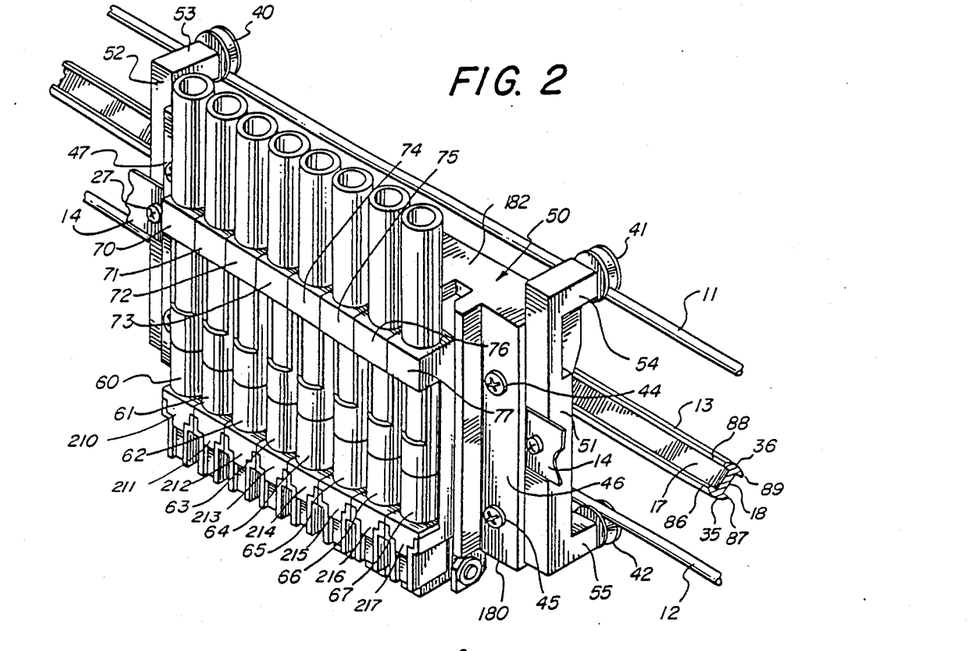
FIG. 2 is a front perspective view of the moveable pen carriage of a graphic recording system having a pen shuttle guide and spring return constructed in accordance with the present invention.

FIG. 2 sets forth an enlarged and more detailed front perspective view of pen carriage 10. As mentioned above, pen carriage 10 is carried upon upper track 11 and lower track 12 by a quartet of grooved wheels 40 through 43 (the latter seen in FIG. 3). Pen shuttle guide 50 includes a rigid top 182 and rigid base 180 forming the upper and lower sides of the generally rectangular configuration of pen shuttle guide 50. Top 182 and base 180 of pen shuttle guide 50 are joined by a generally planar flange portion 46 on one side and an identical planar flange portion 47 on the other. In the preferred form, top 182, base 180 and flange portions 46 and 47 are combined in a single molded unit.

As mentioned, wheel supports 51 and 52 are identical in construction and therefore the following description of structure and the attachment of wheel support 51 to flange 46 should be understood to also describe the structure of wheel support 52 and its attachment to flange 47. As is better seen in FIG. 3, wheel support 52 defines a pair of inwardly extending tabs 57 and 58 which in turn define threaded apertures 69 and 68. Tabs 57 and 58 extend behind flange portion 46 of pen shuttle guide 50. A pair of threaded fasteners 44 and 45 extend through underlying apertures in flange portion 46 (not shown) and are threadably received within apertures 69 and 68 respectively to secure wheel support 51 to flange portion 46 of pen shuttle guide 50. A similar attachment occurs between wheel support 52 and flange portion 47 on the other side of pen shuttle guide 50. As is also set forth above, carriage band 14 is formed of a thin ribbon of stainless steel and extends uninterrupted through the entire structure of pen carriage 10. The configuration of pen carriage 10 which permits carriage band 14 to extend through its operative structure avoids subjecting the elements of pen carriage 10 to the tension existing in carriage band 14.

Actuator beam 13 defines a pair of longitudinally extending parallel channels 17 and 18 and an opposed pair of convex surfaces 35 and 36. In addition, actuator beam 13 defines a pair of longitudinally extending flat surfaces 88 and 89 at each side of convex surface 36 and a pair of similar flat surfaces 86 and 87 at each side of convex surface 35. The functional importance of channels 17 and 18, convex surfaces 35 and 36 and flat surfaces 87 through 89 are set forth in greater detail below and in the above-referenced copending application. However, suffice it to note here that actuator beam 13 comprises an elongated member having a substantially constant cross-section formed in an approximate I-beam shape.

Figure 3:
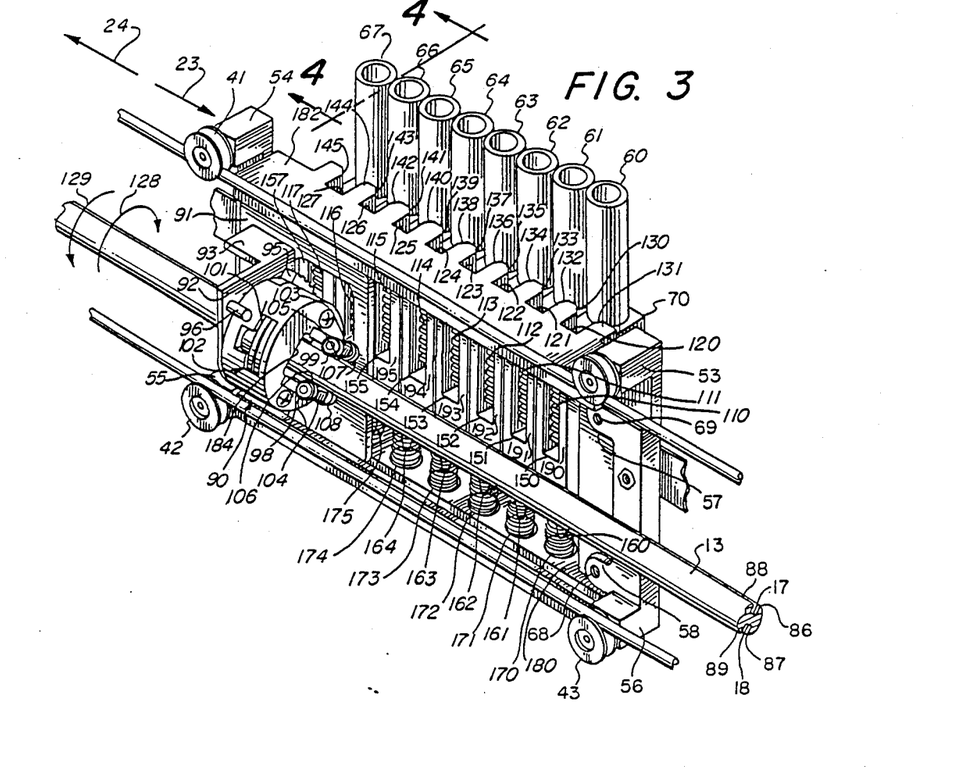
FIG. 3 is a rear perspective view of the moveable pen carriage of a graphic recording system having a pen shuttle guide and spring return constructed in accordance with the present invention.

FIG. 3 sets forth a rear perspective view of pen carriage 10. As set forth above, pen carriage 10 is supported upon upper track 11 and lower track 12 by grooved wheels 40 through 43. As is also set forth above, pen carriage 10 defines a pen shuttle guide 50 which comprises a generally rectangular frame member and which is secured to wheel supports 51 and 52 in a precise alignment with upper track 11 and lower track 12. In accordance with the invention, top 182 of pen shuttle guide 50 defines a plurality of vertically extending pen channels 120 through 127 which are parallel to each other and substantially orthogonal to upper track 11 and lower track 12. Pen shuttle channel 120 defines a pair of inwardly extending angled surfaces 130 and 131 which extend the entire length of pen shuttle channel 120. Similarly, pen shuttle channel 121 defines a pair of angled surfaces 132 and 133, pen shuttle channel 122 defines a pair of angled surfaces 134 and 135, pen shuttle channel 123 defines a pair of angled surfaces 136 and 137, pen shuttle channel 124 defines angled surfaces 138 and 139, pen shuttle channel 125 defines angled surfaces 140 and 141, pen shuttle channel 126 defines angled surfaces 142 and 143, and pen shuttle channel 127 defines angled surfaces 144 and 145. In accordance with an important aspect of the present invention and by means set forth below in greater detail, pen shuttles 70 through 77 are received within pen shuttle channels 120 through 127 respectively and are supported by means including bearing structures which cooperate with the respective angled surfaces of pen shuttle channels 120 through 127 to provide a precise travel path for each of pen shuttles 70 through 77. A plurality of pen shuttle backs 190 through 197 are secured to pen shuttles 70 through 77. The attachments of pen shuttle backs 190 through 197 are set forth below in greater detail. However, suffice it to note here that the attachment between pen shuttle backs 190 through 197 and pen shuttles 70 through 77 respectively captivates pen shuttles 70 through 77 in sliding engagement with pen shuttle channels 120 through 127 respectively. In further accordance with the invention, pen shuttles 70 through 77 are biased to their raised positions shown in FIGS. 2 and 3 by a plurality of coiled springs 170 through 177 (springs 176 and 177 not shown). In other words, pen shuttles 70 through 77 are slideably moveable within pen channels 120 through 127 respectively and are maintained in their top most positions within channels 120 through 127 by the biasing of springs 170 through 177 respectively. However, springs 170 through 177 are selected to have spring constants which may be overcome and which permit pen shuttles 70 through 77 to be moved downwardly to the extended position shown occupied by pen 74 in FIG. 1. This downward position of course, corresponds to the extension of the recording pens which permits recording upon the media.

Pen shuttle backs 190 through 197 are of identical construction and define a plurality of elongated apertures 150 through 157 respectively. A plurality of gear racks 110 through 117 are supported within apertures 150 through 157 respectively in a substantially vertical arrangement.

As described in the above-referenced copending application, actuator beam 13 extends parallel to upper track 11 and lower track 12 and is spaced from tracks 11 and 12. Base 180 defines a pair of channels 181 and 182 which receive a generally planar drive carriage 91. Drive carriage 91 is captivated within channels 181 and 183 in a precise fit which permits drive carriage 91 to be readily moved back and forth across pen shuttle guide 50 for pen shuttle selection.

A generally planar support flange 92 is perpendicular to and joined to drive carriage 91. A gear stop 96 comprising a generally cylindrical extension is joined to support flange 92. While not visible in FIG. 3, support flange 92 also defines an aperture through which actuator beam 13 passes. The size of the aperture in support flange 92 is substantially greater than the dimensions of actuator beam 13 thereby permitting support flange 92 to move freely with respect to actuator beam 13. A generally planar support 93 is joined to drive carriage 91 and the upper edge of support flange 92 to strengthen the attachment of support flange 92 to drive carriage 91. A rotary drive 90 comprises a generally cylindrical housing 100 defining a substantially rectangular center aperture 184 (better seen in FIG. 4) and a irregularly shaped aperture 101. A pair of generally rectangular bearing supports 103 and 104 are joined to and supported by the front surface of drive housing 100 adjacent opposite sides of aperture 184. Bearing support 103 supports an inwardly facing bearing 105 and transversely facing bearings 99 and 107. Similarly, bearing support 104 supports an inwardly facing bearing 106 and transversely facing bearings 98 and 108. A curved gear 95 extends outwardly from drive housing 100 and defines a radius of curvature slightly greater than that of drive housing 100. A shaft mechanism 102 is supported within drive housing 100 and is set forth below in greater detail.

Drive housing 100 is rotatably supported upon support flange 92 and is rotatable in the counterclockwise direction to a maximum counterclockwise position in which hear 95 abuts gear stop 96. As drive housing 100 is rotated from its maximum counterclockwise position, gear 95 moves to a position in which it extends through aperture 94 in drive carriage 91 and into the one of apertures 150 through 157 which are aligned with gear 95. In the position shown in FIG. 3, gear 95 is in alignment with aperture 157 of pen shuttle back 197 and therefore extends through aperture 177 therein. With continued clockwise rotation of drive housing 100, gear 95 engages gear rack 117 of pen shuttle back 197. Thereafter, further clockwise rotation of drive housing 100 causes a downward force to be exerted upon gear rack 117 which in turn overcomes the spring biasing force of spring assembly 177 (not shown) and begins to move pen shuttle 77 in the downward direction. Finally, the clockwise motion of drive housing 100 moves gear rack 117 and pen shuttle 77 in the downward direction until the point of the selected pen contacts the media.

As described in the above-referenced copending application, rotary drive 90 supports a plurality of bearings 98, 99, 105, 106, 107 and 108 which cooperate with channels 17 and 18 of actuator beam 13 to facilitate a mechanical coupling between drive housing 100 and actuator beam 13 without restricting the free movement of rotary drive 90 with respect to actuator beam 13. The extension of bearings 105 and 106 into channels 17 and 18 provides a coupling engagement between actuator beam 13 and drive housing 100 in which rotational motion of actuator beam 13 causes a corresponding rotational motion of drive housing 100. In other words, rotation of actuator beam 13 in the direction indicated by arrow 1128 causes the above-described clockwise rotation of drive housing 100 and rotation of actuator beam 13 in the direction indicated by arrow 129 causes the above-described counterclockwise rotation of drive housing 100.

As mentioned above, housing 100 supports an internal brake mechanism 102, which is set forth below in greater detail. However, suffice it to note here that brake mechanism 102 is operative in response to counterclockwise rotation of actuator beam 13. As gear 95 is rotated toward gear stop 96, brake mechanism 102 engages convex surfaces 35 and 36 to secure rotary drive 90 to actuator beam 13. In its preferred operation, brake 102 engages beam 13 while gear 95 is approximately fifteen degrees away from gear stop 96. In accordance with the operation described below, the securing of brake 102 to convex surfaces 35 and 36 is released when actuator beam 13 is rotated in the clockwise direction from its maximum counterclockwise position.

In operation, pen carriage 10 is moveable, as described above, upon tracks 11 and 12 in the directions indicated by arrows 23 and 24. All motion of pen carriage 10 in the directions indicated by arrows 23 and 24 is imparted by carriage band 14 in accordance with the above-described actions of carriage motor 16, drive pulley 30 and gears 32 and 33. Because drive carriage 91 is freely moveable with respect to pen carriage 10 within channels 181 and 183 of pen shuttle guide 50, rotation of actuator beam 13 near to its maximum counterclockwise position causes brake 102 to grasp convex surfaces 35 and 36 and maintains the position of rotary drive 90 upon actuator beam 13 notwithstanding motion of pen carriage 10. Accordingly, with actuator beam 13 in the specific counterclockwise position and rotary drive 90 secured to actuator beam 13, motion of pen carriage 10 produces a relative motion between rotary drive 90 and pen carriage 10. Because pen shuttles 70 through 77 support pens 60 through 67 in a linear array along the direction of travel of pen carriage 10, selection of a desired one of pens 60 through 67 for recording use is accomplished by locking rotary drive 90 to actuator beam 13 by counterclockwise motion and thereafter moving pen carriage 10 until gear 95 of rotary drive 90 is aligned with the one of apertures 110 through 117 in the pen shuttle back corresponding to the desired pen.

Specifically, with the relative positions of pen carriage 10 and rotary drive 90 shown in FIG. 3 in which gear 95 is aligned with aperture 157 of pen shuttle back 197 corresponding to pen 67, the desired one of the remaining pens 60 through 66 is selected by rotating actuator beam 13 to lock rotary drive 90 to actuator beam 13. Next, pen carriage 10 is moved in the direction indicated by arrow 24 until gear 95 is brought into alignment with the aperture in the pen shuttle back corresponding to the desired pen. For example, in the event pen 63 is selected for next use, pen carriage 10 is moved in the direction of arrow 24 until gear 95 is aligned with aperture 153 in pen shuttle back 193. Thereafter, pen carriage 10 is momentarily stopped while actuator beam 13 is rotated in the clockwise direction indicated by arrow 128 which simultaneously releases brake 102 and moves gear 95 into aperture 153. Once brake 102 is released and gear 95 extends into aperture 153 of pen shuttle back 193, motion of pen carriage 10 in either of the directions indicated by arrows 23 or 24 may be resumed. At this point, gear 95 assumes the position shown in FIG. 4 which corresponds to the "rest position" of the actuator system. Pen shuttle 73 has not yet been brought into a downward movement to facilitate contact of pen 63 with the media. Once pen carriage 10 has reached the position over the media at which it is desired to begin recording upon the media, actuator beam 13 is rotated in the clockwise direction indicated by arrow 128 to cause gear 95 to engage rack 113 and drive pen shuttle 73 and thereby pen 63 downward until contact with the media is established. With contact established with the media by pen 63, the motions of pen carriage 10 and the media set forth in descriptions accompanying FIG. 1 is undertaken to carry out the plotting operation.

At some point if may be desired to disengage pen 63 and select another pen for example, pen 60. The pen changing operation is initiated by rotating actuator beam 13 toward its specific counterclockwise position and momentarily stopping the motion of pen carriage 10. As actuator beam 13 rotates drive housing 100 in the counterclockwise direction, pen shuttle 73 is raised by the action of gear 95 and the force provided by spring 173. Continued counterclockwise rotation of actuator beam 13 and thereby drive housing 100 causes gear 95 to move out of engagement with gear rack 103 leaving pen shuttle 73 in its rest position once housing 100 is moved near to its maximum counterclockwise rotation, brake 102 again engages actuator beam 13 and secures the position of rotary drive 90. Thereafter, pen carriage 10 is moved once again the direction indicated by arrow 24 until gear 95 is brought into alignment with aperture 150 of pen shuttle back 190. A clockwise rotation of actuator beam 13 causes gear 95 to extend into aperture 150 and engage rack 110. Once gear 95 extends into aperture 150, brake 102 is released and motion of pen carriage 10 may be resumed. The extension of gear 95 into aperture 150 of pen shuttle back 190 is sufficient to maintain the alignment of rotary drive 90 with aperture 150 causing rotary drive 90 to be carried along with pen carriage 10. With rotary drive 90 thus engaged in alignment with aperture 150 of pen shuttle back 190, each motion of pen carriage 10 produces a corresponding motion of rotary drive 90.

Because of the coupling of bearings 98, 99 and 105 through 108 to actuator beam 13, the movement of rotary drive 90 during pen carriage motion is facilitated and imposes no additional stress upon the pen carriage drive system., When pen carriage 10 reaches the position over the media in which it is desired to begin plotting with pen 60, actuator beam 13 is rotated in the clockwise direction causing gear 95 to engage rack 110 and drive pen shuttle 70 and thereby pen 60 downward until pen 60 contacts and records against the media. During the recording process with pen 60 extended downward, gear 95 continues to extend into aperture 150 and as a result, rotary drive 90 continues to be carried along by pen carriage 10 in its motions in the directions indicated by arrows 23 and 24.

Thus, pen selection is performed by simply securing rotary drive 90 at a fixed position with respect to actuator beam 13 by counterclockwise rotation of actuator beam 13 to a predetermined position and moving carriage 10 until the appropriate pen is aligned. Rotation of actuator beam 13 causes rotary drive 90 to engage pen carriage 10 at the point corresponding to the selected pen causing rotary drive 90 to be carried by pen carriage 10. It should be noted rotary drive 90 continues to be carried by pen carriage 10 in either the rest position or the recording position. As a result, vertical pen motions in and out of engagement with the media necessary to undertake the above-described plotting operation, are accomplished by pen shuttle supporting rotation of actuator beam 13 to raise and lower the desired pen. It will be apparent to those skilled in the art that the foregoing system requires precise motion of the pen shuttles to maintain the desired accuracy of the plotting operation. It will be equally apparent that the free movement of the pen shuttles within the pen shuttle channels is essential to proper operation of the above-described recording system.

Figure 4:
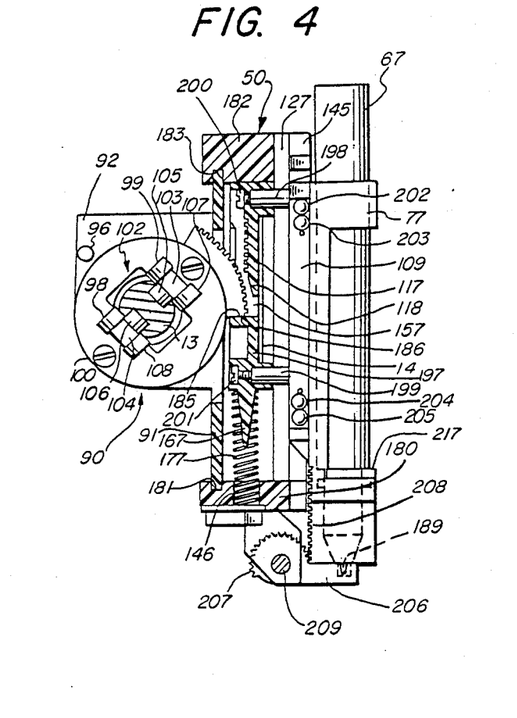
FIG. 4 is a section view of a graphic recording system having the present invention pen shuttle guide and spring return taken along Section lines 4—4 in FIG. 3 depicting a nonrecording position.
Figure 5:
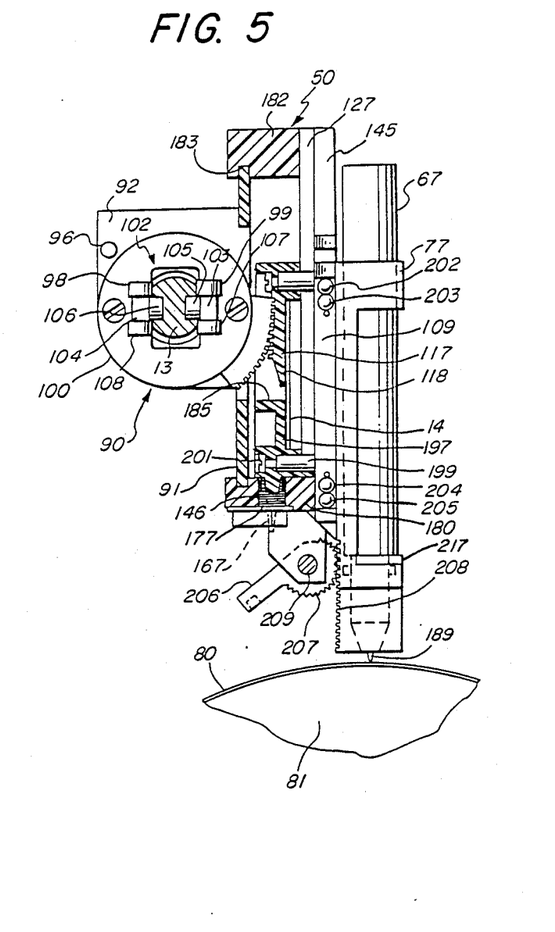
FIG. 5 is a section view of a graphic recording system having the present invention pen shuttle guide and spring return taken along Section lines 4—4 in FIG. 3 depicting a recording position.
Figures 6, 7:
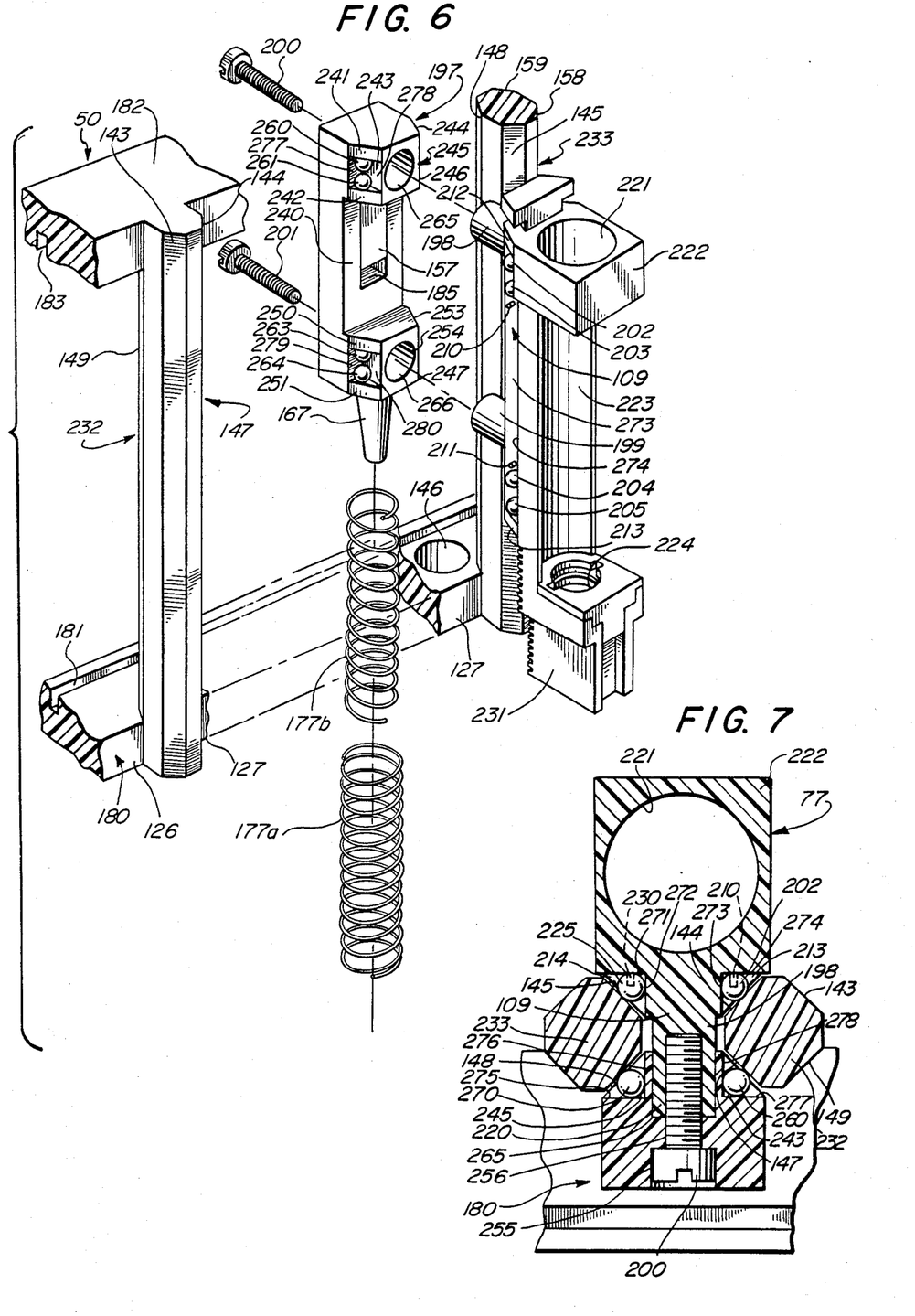
FIG. 6 is a partially sectioned assembly view of the present invention pen shuttle guide and spring return.
FIG. 7 is a partial section view of the present invention pen shuttle guide and spring return taken along Section lines 7—7 in FIG. 5.

FIG. 4 sets forth the present invention pen shuttle guide and spring return in the rest position in which a selected pen has been engaged but is not moved into the recording position. FIG. 5 sets forth the selected pen shuttle and pen in the write or record position. FIGS. 6 and 7 set forth the structure of pen shuttle 77 and its guide and return system within channel 127. It should be noted that pen shuttles 70 through 76 are supported and guided within channels 120 through 126 in the same manner. Accordingly, the descriptions of pen shuttle 77 within channel 127 which follow in connection with FIGS. 4 through 7 should be understood to apply equally well to pen shuttles 70 through 76 within channels 120 through 126.

With respect to FIG. 4, pen shuttle guide 50 defines a top 182 having an upwardly extending channel 183 and a base 180 having a downwardly extending channel 181. Pen shuttle guide 50 defines a pen channel 127, the structure of which is set forth above. Pen shuttle 77 supports pen 67 in a vertical position and defines a pair of inwardly extending generally cylindrical bosses 198 and 199. Pen shuttle 77 further supports a plurality of ball bearings 202, 203, 204 and 205 as well as an additional similar plurality of the ball bearings (not seen) on the other side of rib 109. The function of ball bearings associated with rib 109 of pen shuttle 77 is to provide a suitable rolling bearing for sliding contact with angled surfaces 144 and 145 of pen shuttle channel 127. Bosses 198 and 199 are received within pen shuttle back 197 and secured thereto by a pair of threaded fasteners 200 and 201. As mentioned, pen shuttle back 197 defines an aperture 157 within which gear rack 117 is supported. Gear rack 117 defines a generally tapered surface 118. A generally flat edge 185 forms the bottom surface of aperture 157. Pen shuttle back 197 further defines a generally conical, downwardly extending spring guide 167. Base 180 further defines a recess 146. A coiled spring assembly 177 is compressively supported at one end within recess 146 and at the other end by its encircling of spring guide 167. In accordance with an important aspect of the present invention, spring assembly 177 comprises a combination of a left hand and right hand wound nested pair, the structures of which are set forth below in greater detail. Actuator beam 13 extends through aperture 184 in rotary drive housing 100 and is engaged by bearings 98, 99 and 105 through 108 as described above. Drive housing 100 is supported by support flange 92 and gear 95 extends outwardly from drive housing 100. A pen cap 206 is pivotally supported beneath base 180 by a pin 209. Pen cap 206 further defines a gear portion 207 concentrically positioned with respect to pin 209. Pen shuttle 77 defines a gear rack 208 which engages gear portion 207.

In the position shown in FIG. 4, rotary drive 90 is in the rest position in which gear 95 extends into aperture 157 of pen shuttle back 197 and in which brake 102 is disengaged from actuator beam 13. In this position, and as described above, rotary drive 90 is freely carried by the motion of pen carriage 10 and pen 67 is removed from contact with the media. Gear 95 defines a lower edge 186 which, in the rest position, is in contact with lower edge 185 of aperture 157. The compressive force of spring assembly 177 urges pen shuttle 77 upwardly to a position in which the upper portion of pen shuttle back 197 abuts the under surface of top 182 of pen shuttle guide 50. Once actuator beam 13 is rotated in the clockwise direction causing drive housing 100 and gear 95 to be rotated in the clockwise direction, a downward force is applied to edge 185 of aperture 157 by edge 186 of gear 95. This force overcomes the force of spring assembly 177 and moves pen shuttle back 197 and thereby pen shuttle 77 downwardly within channel 127. With continued rotation of drive housing 100, gear 95 engages gear rack 117 and the downward motion of pen shuttle 77 continues. It should also be noted that pen cap 206 is in its closed position when pen shuttle 77 is in the rest position shown in FIG. 4.

FIG. 5 is identical to FIG. 4 with the exception that pen 67 has been moved to the recording position in which drive housing 100 is rotated in the clockwise direction causing gear 95 and rack 117 to cooperate to drive pen shuttle 77 downward until pen 67 contacts the media. If no pen to media contact occurs, pen shuttle back 197 abuts base 180 of pen shuttle guide 50 and pen 67 receives its maximum downward extension. In either event, spring assembly 177 is compressed within recess 146 in base 180 and is captivated by the extension of spring guide 167 through the center of spring assembly 177 and into recess 146. It should be noted that in the position shown in FIG. 5, brake 102 is out of contact with actuator beam 13 and rotary drive 90 is released from any engagement with actuator beam 13. This permits the above-described motion of the combination of rotary drive 90 and pen carriage 10 as pen 67 is used to record upon the media. With pen shuttle 77 in its downward position, gear rack 208 pivots gear portion 207 and pen cap 206 to expose pen point 189.

FIG. 6 sets forth a partially sectioned assembly view of pen shuttle 77 and its assembly to pen shuttle back 197 within channel 127. It should be noted that the assembly and structure of pen shuttle 77, pen shuttle back 197 and pen channel 127 is representative of the corresponding assemblies of pen shuttles 70 through 76 to pen shuttle backs 190 through 196 within their respective channels 120 through 126. Accordingly, the descriptions which follow in conjunction with FIGS. 6 and 7 should be understood to apply equally well and be equally descriptive of the remaining pen shuttles and pen shuttle backs and their operation within their respective pen channels.

Pen shuttle guide 50 defines a top member 182 which in turn defines a channel 183. Pen shuttle guide 50 further defines a base member 180 which in turn defines a channel 181. As mentioned above, channels 181 and 183 support rotary drive 90 (seen in FIG. 3) in its movement with respect to pen shuttles 70 through 77. A multifaceted column 232 extends between top 182 and base 180 in a perpendicular relationship thereto. A second multifaceted column 233 extends between base 180 and top 182 in a parallel relationship to column 232. Columns 232 and 233 are of identical cross section, the character of which is set forth more clearly in FIG. 7. Column 232 defines a pair of angled surfaces 144 and 143 on its front portion and a pair of similar angled surfaces 147 and 149 on its rearwardly extending portion. Similarly, column 233 defines a pair of angled surfaces 145 and 158 on its forwardly extending portion and a pair of angled surfaces 148 and 159 on its rearwardly extending portion. In accordance with the invention, surfaces 145 and 144 are positioned on either side of channel 127 formed between columns 232 and 233 and form guide surfaces for pen shuttle 77. Similarly, surfaces 147 and 148 on the rear portions of columns 232 and 233 respectively also form guide surfaces for pen shuttle back 197.

Pen shuttle 77 defines an outwardly extending upper support member 222 which in turn defines a pen aperture 221. Pen shuttle 77 further defines a concave cylindrical surface 233 extending downwardly from and generally concentric with pen aperture 221. Pen shuttle 77 further defines a lower pen support 231 which in turn defines a pen locking aperture 224. A vertical rib 109 extends upwardly from lower support 231 on the opposite side of pen shuttle 77 from concave surface 223 and terminates at upper support 222. Pen shuttle 77 further defines a pair of extending cylindrical bosses 198 and 199 which are joined to pen shuttle 77 at rib 109. Cylindrical boss 198 defines an internal threaded aperture 220 (better seen in FIG. 7). Similarly, while not seen in FIGS. 6 and 7, cylindrical boss 199 defines a similar threaded aperture. Rib 109 defines a planar surface 273 and an angled web 212 at the upper end of surface 273 and a similar angled web 213 at the lower end of surface 273. Pen shuttle 77 further defines a generally cylindrical pin 210 spaced from angled web 212 and a similar cylindrical pin 211 spaced from angled web 213. A planar surface 274 is generally perpendicular to and joined to surface 273 and extends between angled web 212 and angled web 213. In accordance with an important aspect of the present invention, a pair of spherical ball bearings 202 and 203 are received within the corner channel formed by surfaces 273 and 274 and positioned between pin 210 and angled web 212. Similarly, a second pair of ball bearings 204 and 205 are received within the corner channel formed by surfaces 273 and 274 and are positioned between pin 211 and angled web 213. In further accordance with an important aspect of the present invention set forth below in greater detail, ball bearings 202 and 203 and ball bearings 204 and 205 are maintained in the positions shown in FIG. 7 when pen shuttle 77 is assembled to pen channel 127 and rollingly abut surface 144 of column 232 to provide one portion of the bearing guide for pen shuttle 77.

While not visible in FIG. 6 and partially seen in FIG. 7, it should be understood that pen shuttle 77 supports a second pair of orthogonal surfaces on the reverse side of rib 109 which are identical to surfaces 273 and 274. In addition, a set of pins identical to 210 and 211 and angled webs identical to angled webs 212 and 213 are formed on the reverse side of rib 109 to duplicate the structure seen in FIG. 6. In further addition, a quartet of ball bearings are positioned on the reverse side of rib 109 in the same manner as ball bearings 202 through 205 in FIG. 6. Thus when the inventive structure is assembled, pen shuttle 77 is received within channel 127 in the manner shown in FIG. 7 such that two groups of four ball bearings are captivated and rollingly contact surfaces 144 and 145 of columns 232 and 233.

Pen shuttle back 197 defines a generally elongated rectangular member having a downwardly extending conical spring guide 167, a notch 240 and a rectangular aperture 157. Pen shuttle back 197 further defines a recess 265, an aperture 256 and a recess 255. Recess 265, aperture 256 and recess 255 are of circular cross section and in concentric alignment extending through pen shuttle back 197 (better seen in FIG. 7). A second recess 266, identical to recess 265, is formed in pen shuttle back 197. While not visible in FIGS. 6 and 7, pen shuttle back 197 defines a cylindrical aperture and recess identical to aperture 256 and recess 255 and concentric with recess 266. Pen shuttle back 197 further defines a pair of orthogonal surfaces 277 and 278 and a pair of angled webs 241 and 242 which form a cavity 243. Cavity 243 receives a pair of spherical ball bearings 260 and 261. A second pair of orthogonal surfaces 279 and 280 and a second pair of angled webs 250 and 251 form a similar cavity 252 at the lower end of pen shuttle back 197 which receive a second pair of ball bearings 263 and 264. In accordance with the invention, ball bearings 260 and 261 and ball bearings 263 and 264 are sized to be received within cavities 243 and 252 respectively such that they extend beyond angled webs 241 and 242 and angled webs 250 and 251. As is better seen by simultaneous reference to FIGS. 6 and 7, pen shuttle back 197 defines a pair of webs 244 and 246 which form a cavity 245 identical to cavity 243 on the opposite side of pen shuttle back 197. Similarly, a pair of webs 253 and 247 define a cavity 254 identical to cavity 252 at the lower end of pen shuttle back 197. In further similarity, cavities 245 and 254 receive respective pairs of ball bearings identical to ball bearings 260 and 261 and ball bearings 263 and 264. Thus, it should be understood that pen shuttle back 197 is symmetrical about a vertical plane extending through the center of recesses 265 and 266.

A pair of coil springs 177a and 177b are received within recess 146 in base 180 of pen shuttle guide 50. As is better seen in FIG. 4 and in accordance with an important aspect of the present invention, coil spring 177a is wound in a right-hand helix and is received within recess 146 and receives spring guide 177. In further accordance with an important aspect of the present invention, coil spring 177b is wound in a smaller diameter left-hand helix and is nested within coil spring 177a. Coil spring 177b receives spring guide 167 and is received within recess 146 in the same manner as spring 177a. Thus, coil springs 177a and 177b comprise oppositely wound helical coiled springs which are assembled in a nested pair to form spring assembly 177 (seen in FIGS. 4 and 5). It will be apparent to those skilled in the art that the helical windings of springs 177a and 177b may be reversed while still providing the oppositely wound nested pair of the present invention structure. Thus, in the alternative, spring 177a may be left-hand helically wound and spring 177b right-hand helically wound without departing from the spirit and scope of the present invention. The use of oppositely wound nested coiled springs in the present invention structure has been selected to provide a carefully controlled spring constant for the return force of the present invention pen shuttle guide and spring return.

FIG. 7 sets forth a section view of the present invention pen shuttle guide and spring return taken along Section lines 7—7 in FIG. 5. As mentioned, columns 232 and 233 are supported in a spaced parallel fashion extending upwardly from base 180 and terminating at top 182 (the latter seen in FIG. 6). The spaced parallel arrangement of columns 232 and 233 forms pen channel 127 between the columns. Column 232 defines an angled guide surface 144 while column 233 defines an angled guide surface 145. Surfaces 143 and 145 extend the lengths of columns 232 and 233 respectively. Column 232 forms a second guide surface 147 while column 233 forms a second guide surface 148. Surfaces 147 and 148 also form guide surfaces which extend the lengths of columns 232 and 233 respectively to complete pen channel 127.

Pen shuttle 77 defines an upper support 222 which in turn defines a pen aperture 221 and an extending rib 109. A pair of orthogonal surfaces 273 and 274 are formed on one side of rib 109 while a similar pair of orthogonal surfaces 272 and 271 are formed on the other side of rib 109. A cylindrical boss 198 extends from rib 109 which in turn defines a threaded aperture 220.

Pen shuttle back 197 defines a cylindrical recess 265, an aperture 256 and a recess 255 in concentric arrangement. In accordance with an important aspect of the present invention, cylindrical boss 198 is received within recess 265 and is maintained therein by a threaded fastener 200 which is received within recess 255 and extends through aperture 256 and is threadably engaged within threaded aperture 220. Similarly and with temporary reference to FIG. 6, cylindrical boss 199 is received within recess 266 of pen shuttle back 197 and secured therein by a fastener 201 in the same manner as described for fastener 200. Returning to FIG. 7, pen shuttle back 197 defines a pair of orthogonal surfaces 277 and 278 which form a cavity 243 on one side of recess 265 and a similar pair of surfaces 275 and 276 which form a cavity 245 on the other side of recess 265. In accordance with the foregoing descriptions in connection with FIG. 6, cavities 243 and 245 receive respective pairs of ball bearings in the manner shown for ball bearings 260 and 270 in FIG. 7. As is best seen in FIG. 6, it should be noted that cavities 254 and 252 are similarly configured and receive respective pairs of ball bearings in the manner shown by ball bearings 263 and 264. Thus, it should be noted that in the assembled structure of the present invention, ball bearings 202 through 205 are captivated between surfaces 273 and 274 and surface 144 on one side of pen shuttle 77 to provide a spacing between pen shuttle 77 and pen channel 127 in which the sole contact therebetween is provided by ball bearings 202 through 205. It should also be noted that a similar quartet of bearings is captivated by surfaces 271 and 272 against surface 144 to provide the sole contact therebetween on the opposite side of pen shuttle 77. In a similar manner, ball bearings 260 and 261 and bearings 263 and 264 are captivated on one side of pen shuttle back 197 within cavities 243 and 252 against surface 147 of pen channel 127 while similar bearing pairs are captivated within cavities 245 and 254 against surface 148 on the other side of pen shuttle back 197. As a result, pen shuttle back 197 is spaced from pen channel 127 such that the sole contact between pen shuttle back 197 and columns 232 and 233 is provided by the captivated ball bearings.

As is best seen in FIG. 7, the attachment of pen shuttle 77 to pen shuttle back 197 within pen channel 127 captivates the pen shuttle and pen shuttle back with respect to columns 232 and 233 in a manner permitting the combination of pen shuttle 77 and pen shuttle back 197 to be slidingly moved vertically with respect to pen shuttle guide 150 within pen channel 127. During the movement of pen shuttle 77 and pen shuttle back 197 within pen channel 127, the captivated ball bearings roll upon their respective captivating surfaces to provide supporting bearings for the pen shuttle and pen shuttle back.

In accordance with an important aspect of the present invention, the use of captivated ball bearings in the configuration shown provides a structure which readily compensates for the various tolerance variations in components to be anticipated during the manufacturing process. Thus, variations in the size of columns 232 and 233 is readily accommodated by the threaded attachment of fasteners 200 and 210. Variations in angled surfaces 144 and 145 and angled surfaces 147 and 148 are readily accommodated by the aspect of the present invention in which the sole contact between pen shuttle 77 and pen shuttle back 197 occurs between the spherical ball bearings. In essence, the contacts between the spherical surfaces of the ball bearings and the planar surfaces of guide surfaces 144, 145, 147 and 148 are, in a sense, automatically self-aligning.

With simultaneous reference to FIGS. 4, 5, 6 and 7, several advantages of the present invention structure may be shown. Initially, it should be noted that each of the ball bearing pairs operative within pen shuttle 77 and pen shuttle back 197 are captivated near the ends of the structures they support. For example, ball bearings 260 and 261 are captivated at the upper end of pen shuttle back 197 and ball bearings 263 and 264 are captivated near the lower end of pen shuttle back 197. Ball bearings 202 and 203 are captivated near the upper end of pen shuttle 77 by angled web 212 and pin 210 and ball bearings 204 and 205 are captivated near the lower end of pen shuttle 277 by web 213 and pin 211. Maintaining the respective bearing pairs near the ends of the structures they support provides for maximum lateral support for pen shuttle 77 and pen shuttle back 197. When so configured, the stability of the assembled pen shuttle and pen shuttle back within the pen shuttle guide is maximized at all points of pen shuttle travel. The most critical need for support arises when pen shuttle 77 is moved downwardly to the recording position shown in FIG. 5. In the recording position, the pen shuttle is maximally extended and a lateral force is applied to pen tip 189 by the carriage and media movement. This lateral force is coupled to the pen shuttle support through a relatively long lever arm formed by the extended pen shuttle. Thus, any slack or give in the pen shuttle support results in undesired movement of pen tip 189 and in accuracy of pen tip placement and movement on the media. The above-described bearing placement avoids this problem. Specifically with reference to FIG. 5, bearings 204 and 205 as well as the corresponding pair of bearings on the other side of pen shuttle 77 (not shown) travel downward with pen shuttle 77 and therefore remain close to pen tip 189. Thus, pen shuttle 77 and recording pen 67 are supported near pen tip 189 in a secure manner. By way of further advantage, the use of nested oppositely wound springs 177a and 177b to form spring assembly 177 provides substantial flexibility in selecting the resulting spring force used to return pen shuttle 77 to its upper position (shown in FIG. 4) in the absence of a downward force. In addition, the use of oppositely wound helical springs in combination with conical spring guide 167 and recess 146 maintain the position of spring assembly 177 while permitting free movement of spring assembly 177 and avoiding any binding between springs 177a and 177b or spring distortion or misalignment which might otherwise occur. Finally, the use of spherical bearings rolling upon planar guide surfaces in a quadrature arrangement (see FIG. 7) provides the above-described tolerance compensation and self-alignment character which greatly simplifies the manufacturing process.

What has been shown is a pen shuttle guide and spring return for a graphic recording system in which a graphic recording system having a moveable pen carriage, a plurality of recording pens in a linear array, and pen selecting means are operative. The recording pens are supported within pen shuttles which in turn are moveable within pen shuttle channels to provide accurate controllable pen selection and motion.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. In a graphic recording system having motion means for supporting and moving a pen carriage along a carriage path, pen shuttle guide means comprising:
   a pen carriage supported and moved by and under the control of said motion means, having a plurality of pen channels each having first and second pluralities of parallel guide surfaces;
   a plurality of pen shuttles configured to receive a corresponding plurality of recording elements slideably supported against said first plurality of guide surfaces within said plurality of pen channels;
   a plurality of pen shuttle backs each secured to one of said pen shuttles and slideably supported against said second plurality of guide surfaces within one of said pen channels, said pen shuttles and pen shuttle backs forming pen assemblies each captivated within one of said pen channels and moveable between raised and lowered positions therein;
   first bearing means interposed between said pen shuttles and said first plurality of guide surfaces; and
   second bearing means interposed between said pen shuttle backs and said second plurality of guide surfaces.

2. Pen shuttle guide means as set forth in claim 1 wherein said pen channels are configured in a linear array and wherein said pluralities of pen shuttles and pen shuttle backs are supported in said linear array.

3. Pen shuttle guide means as set forth in claim 2 wherein each of said pen channels in said plurality of pen channels defines an elongated slot having front and rear side edges and wherein said first plurality of guide surfaces are disposed in pairs adjacent said slots and formed in said front side edges and said second plurality of guide surfaces are disposed in pairs adjacent said slots and formed in said rear side edges.

4. Pen shuttle guide means as set forth in claim 3 wherein said first bearing means include a first plurality of ball bearings interposed between said pen shuttles and said first plurality of guide surfaces and wherein said second bearing means include a said second plurality of ball bearings interposed between said pen shuttle backs and said second plurality of guide surfaces.

5. Pen shuttle guide means as set forth in claim 4 wherein said pen shuttle backs each define an elongated member having end portions and a pair of cylindrical recesses therebetween and wherein said pen shuttles each define end portions and a pair of cylindrical bosses therebetween extending through one of said slots and being received within said pair of cylindrical recesses.

6. Pen shuttle guide means as set forth in claim 5 wherein end portions of said pen shuttle backs each define a pair of cavities overlying said second plurality of guide surfaces, each of said cavities supporting a pair of said ball bearings.

7. Pen shuttle guide means as set forth in claim 6 wherein said end portions of said pen shuttles each define a pair of bearing channels overlying said first plurality of guide surfaces each of said bearing channels supporting a pair of said ball bearings.

8. Pen shuttle guide means as set forth in claim 7 wherein said pairs of ball bearings supported in said cavities and said bearing channels are confined therein to travel shorter distances therein as said ball bearings are moved across said guide surfaces.

9. Pen shuttle guide means as set forth in claim 8 wherein said pen shuttle backs each define a downwardly extending tapered spring guide and wherein said pen shuttle guide means includes a nested pair of oppositely wound helical springs received about said spring guide and compressively coupled between each of said pen shuttle backs and said pen carriage to bias each of said pen shuttles and pen shuttle backs to their raised positions with respect to said pen carriage.

10. For use in a graphic recorder in which a pen carriage is moveably supported upon a pen carriage path, pen shuttle guide means comprising:
 a pen carriage having a front side and a rear side and a plurality of vertical slots extending therebetween arranged in a linear array and having front pairs of inwardly angled planar front guide surfaces on said front side adjacent each of said slots and extending substantially the lengths thereof and having rear pairs of inwardly angled planar rear guide surfaces on said rear side adjacent each of said slots and extending substantially the lengths thereof;
 a plurality of pen shuttles each configured to receive and support a recording pen and defining an elongated member having first bearing means positioned to contact said front guide surfaces when said pen shuttle is received within one of said vertical slots from said front side;
 a plurality of pen shuttle backs each defining an elongated member having second bearing means positioned to contact said rear guide surfaces when said pen shuttle back is received within one of said vertical slots from said rear side;
 a plurality of attachment means securing each of said pen shuttles to respective ones of said pen shuttle backs to form a plurality of pen assemblies in which each of said pen shuttles is secured to one of said pen shuttle backs and slideably captivated against said front and rear guide surfaces respectively and moveable between a raised position and a lowered position; and
 return spring means biasing said pen assemblies to their uppermost positions within said vertical slots.

11. Pen shuttle guide means as set forth in claim 10 wherein said pen carriage includes a transverse top member, a transverse bottom member and a plurality of multifaceted vertical columns extending therebetween in a spaced parallel arrangement in which the spaces between said columns form said vertical slots.

12. Pen shuttle guide means as set forth in claim 11 wherein said multifaceted columns define said front and rear guide surfaces.

13. Pen shuttle guide means as set forth in claim 12 wherein said pen shuttles each define opposite sides, an upper end having first and second pairs of generally orthogonal surfaces forming an upper pair of outwardly facing bearing channels on said opposite sides, and a lower end having first and second pairs of generally orthogonal surfaces forming a lower pair of outwardly facing bearing channels on said opposite sides and wherein said first bearing means include a first plurality of ball bearings distributed and received within said upper and lower pairs of bearing channels.

14. Pen shuttle guide means as set forth in claim 13 wherein said pen shuttle backs each define opposite sides an upper end and a lower end, an upper pair of bearing cavities in said opposite sides proximate said upper end, and a lower pair of bearing cavities in said opposite sides proximate said lower end and wherein said second bearing means include a second plurality of ball bearings distributed and received within said upper and lower pairs of cavities.

15. Pen shuttle guide means as set forth in claim 14 wherein said pen shuttles each define a downwardly extending tapered spring guide below said lower end and said transverse bottom member defines a plurality of recesses aligned with said slots and wherein said return spring means include a plurality of nested pairs of oppositely wound helical springs, each pair being received upon one of said spring guides and within one of said recesses.

16. Pen shuttle guide means as set forth in claim 15 wherein said attachment means include pairs of cylindrical bosses formed on said pen shuttles and extending through the respective one of said slots and pairs of cylindrical recesses formed within said pen shuttle backs and aligned with and receiving said cylindrical bosses.

17. Pen shuttle guide means as set forth in claim 16 wherein said first and second pluralities of ball bearings are distributed within said upper and lower pairs of bearing channels and said upper and lower pairs of cavities in bearing pairs.

18. Pen shuttle guide means as set forth in claim 17 wherein said upper and lower pairs of bearing channels each define projections extending in said bearing channels to limit the travel of said pairs of ball bearings to the end portions thereof.

19. Pen shuttle guide means as set forth in claim 18 wherein each of said spring guides extends into a respective one of said recesses when its pen shuttle is moved to its lowered position.

* * * * *